(12) United States Patent
Smith

(10) Patent No.: US 7,216,332 B2
(45) Date of Patent: May 8, 2007

(54) SOFTWARE OBJECT LIBRARY SELECTION

(75) Inventor: Lee D. Smith, Cambridge (GB)

(73) Assignee: Arm Limited, Cambridge (GB)

( * ) Notice: Subject to any disclaimer, the term of this patent is extended or adjusted under 35 U.S.C. 154(b) by 732 days.

(21) Appl. No.: 10/378,658

(22) Filed: Mar. 5, 2003

(65) Prior Publication Data

US 2003/0182650 A1    Sep. 25, 2003

Related U.S. Application Data

(63) Continuation-in-part of application No. 09/503,485, filed on Feb. 14, 2000, now abandoned.

(51) Int. Cl.
*G06F 9/44*    (2006.01)

(52) U.S. Cl. .................. 717/106; 717/163; 717/120

(58) Field of Classification Search ............... 717/106, 717/163, 120
See application file for complete search history.

(56) References Cited

U.S. PATENT DOCUMENTS

| | | | | |
|---|---|---|---|---|
| 5,307,492 A * | 4/1994 | Benson | ................ | 717/159 |
| 5,408,665 A * | 4/1995 | Fitzgerald | ................ | 707/10 |
| 5,583,983 A * | 12/1996 | Schmitter | ................ | 717/138 |
| 5,854,929 A * | 12/1998 | Van Praet et al. | ................ | 712/223 |
| 5,920,723 A * | 7/1999 | Peyton, Jr. et al. | ................ | 717/157 |
| 5,923,882 A * | 7/1999 | Ho et al. | ................ | 717/147 |
| 6,003,095 A * | 12/1999 | Pekowski et al. | ................ | 717/163 |
| 6,021,272 A * | 2/2000 | Cahill et al. | ................ | 717/147 |
| 6,202,205 B1 * | 3/2001 | Saboff et al. | ................ | 709/331 |
| 6,212,673 B1 * | 4/2001 | House et al. | ................ | 717/100 |
| 6,370,685 B1 * | 4/2002 | Robison | ................ | 717/141 |
| 6,898,788 B2 * | 5/2005 | Kosaka et al. | ................ | 717/162 |
| 6,961,932 B2 * | 11/2005 | Mishra et al. | ................ | 717/136 |
| 2003/0070159 A1 * | 4/2003 | Webb | ................ | 717/116 |

OTHER PUBLICATIONS

Johnson, et al, "Building an evolution transformation library", IEEE, pp. 238-248, 1990.*
Philip R. Banks, ARM Chip List, Oct. 1998, ARMLtd.*

* cited by examiner

*Primary Examiner*—Hoang-Vu Antony Nguyen-Ba
(74) *Attorney, Agent, or Firm*—Nixon & Vanderhye P.C.

(57) ABSTRACT

A software development system is described in which lattice theory is used to model the compatibility and desirability in the target execution environment of various build option parameters selected by a user. A library selector is formed by combining the build option parameters of each source code entity to produce a selector having the maximum level of execution environment requirements needed among the group of source code entities being compiled. This library selector may be used to select a particular library of machine code entities compatible with these execution environment requirements whilst providing the most desirable machine code entities to exploit the capabilities of the target data processing system.

24 Claims, 4 Drawing Sheets

SOFTWARE OBJECT LIBRARY SELECTION

This application is a continuation-in-part of application Ser. No. 09/503,485, filed Feb. 14, 2000 now abandoned, the entire content of which is hereby incorporated by reference in this application.

BACKGROUND OF THE INVENTION

1. Field of the Invention

This invention relates to the field of data processing systems. More particularly, this invention relates to techniques for generating machine code entities based upon source code entities using libraries of machine code entities.

2. Description of the Prior Art

It is known to provide software development tools including a plurality of libraries of machine code entities. The different libraries of machine code entities cater for different build options that may be selected by a user. As an example, a user may wish to use the same source code entities to generate machine code entities for differing target processor instruction set versions or for target processors having different hardware capabilities. The machine code entities within the different libraries are matched to the different build options to which they relate to produce the most efficient processing for those build options.

The number of user specified options in such systems is increasing. As a consequence, the number of possible different combinations of build options is rapidly increasing to become a large number of possible combinations It is desirable that the machine code entity libraries provided in a software development tool system should be usable with all possible build options that a user might select. One solution might be to provide a software library for every possible combination of build options. However, the large number of possible combinations of build options make this impractical. A related problem is how a user is to select the correct library to use from among a large number of libraries.

SUMMARY OF THE INVENTION

Viewed from one aspect the present invention provides apparatus for generating a group of machine code entities for execution upon a target data processing apparatus from a group of source code entities, each source code entity having at least one build option parameter, said apparatus for generating comprising:
(i) library selector forming logic responsive to said at least one build option parameter of each source code entity for forming a library selector, wherein.
  (a) build option parameters of each source code entity are combined in accordance with lattice theory whereby each build option parameter has a value indicative of position within a partially ordered lattice chain representing relative execution environment requirements for that build option parameter, and
  (b) said library selector is formed with components corresponding to a limiting level of execution environment requirements among said group of source code entities;
(ii) library selecting logic responsive to said library selector for selecting, from among a plurality of libraries of machine code entities, a selected library of machine code entities having a best level of execution environment requirements compatible with said limiting level of execution environment requirements indicated by said library selector; and
(iii) machine code entity generating logic for generating said group of machine code entities from machine code entities within said selected library of machine code entities to dependence upon said group of source code entities.

The invention recognizes that lattice theory techniques can be applied to the characterization of build option parameters to rigorously model execution environment requirements so that a library selector may be generated for a group of source code entities representing the maximum execution environment requirements of that group of source code entities (object code) and then this library selector may be used to identify a suitable library of machine code entities (such as files, sections or symbols) This rigorous approach allows the selection of the most suitable library of machine code entities (for generating an executable image) to be automated whilst ensuring that the selected library will be compatible with the execution environment requirements and be an efficient library.

The use of lattice theory modeling techniques for the execution environment requirements of the source code entities also allows incompatibilities between source code entities to be identified in a rigorous manner.

In preferred embodiments incompatibility is indicated by the detection of a lattice top in one or more of the independent components of the library selecting vector.

In order to reduce the total number of libraries that need to be provided preferred embodiments of the invention embed more than one minor variant of some machine code entities within a library with the final selection of the machine code entity being made amongst these minor variants using the build option parameters for the specific source code entity requiring that machine code entity. See Section 3.3.1 of the attached Appendix.

It will be appreciated that the source code entities could be formed from many different computer programing languages, However, the present invention is particularly well suited to systems in which the source code entities are formed from C or C++ or assembly language source code entities for the target data processor.

The different build options that may be specified by a user of the software development tools include an instruction set identifier for the target data processing system, the identification of any optional instruction processing hardware present (e.g. a floating point unit, a vector floating point unit etc), the endianness, position independence, stack checking status, memory system capabilities and procedure call options.

The invention is particularly well suited to systems in which those build options giving rise to the greatest demands on the execution environment have significant advantages (such as greater performance or smaller size) since the system allows the library best matched to those more demanding options to be selected rather than the most compatible library that might be significantly sub-optimal in that execution environment.

Viewed from another aspect the present invention provides a method of generating a group of machine code entities for execution upon a target data processing apparatus from a group of source code entities, each source code entity having at least one build option parameter, said method of generating comprising the steps of:

(i) in response to said at least one build option parameter of each source code entity, forming a library selector, wherein:
  (a) build option parameters of each source code entity are combined in accordance with lattice theory whereby each build option parameter has a value indicative of position within a partially ordered lattice chain representing relative execution environment requirements for that build option parameter, and
  (b) said library selector is formed with components corresponding to a limiting level of execution environment requirements among said group of source code entities;
(ii) in response to said library selector, selecting, from among a plurality of libraries of machine code entities, a selected library of machine code entities having a best level of execution environment requirements compatible with said limiting level of execution environment requirements indicated by said library selector; and
(iii) generating said group of machine code entities from machine code entities within said selected library of machine code objects in dependence upon said group of source code entities.

Viewed from a further aspect the present invention provides a computer program carrier, e.g., such as a computer readable medium, bearing (storing) a computer program for controlling a data processing apparatus to perform a method of generating a group of machine code entities for execution upon a target data processing apparatus from a group of source code entities, each source code entity having at least one build option parameter, said method of generating comprising the steps of:
(i) in response to said at least one build option parameter of each source code entity, forming a library selector, wherein:
  (a) build option parameters of each source code entity are combined in accordance with lattice theory whereby each build option parameter has a value indicative of position within a partially ordered lattice chain representing relative execution environment requirements for that build option parameter, and
  (b) said library selector is formed with components corresponding to a limiting level of execution environment requirements among said group of source code entities;
(ii) in response to said library selector, selecting, from among a plurality of libraries of machine code entities, a selected library of machine code entities having a best level of execution environment requirements compatible with said limiting level of execution environment requirements indicated by said library selector; and
(iii) generating said group of machine code entities from machine code entities within said selected library of machine code entities in dependence upon said group of source code entities.

Viewed from a still further aspect the present invention provides a method of forming a set of libraries of machine code entities for use in generating a group of machine code entities for execution upon a target data processing apparatus from a group of source code entities, each source code entity having at least one build option parameter, said method of forming comprising tie steps of:
(i) associating a library selector with each library of machine code entities, wherein:
  (a) supported build option parameters for each machine code entity within a library are combined in accordance with lattice theory whereby each build option parameter has a value indicative of position within a partially ordered lattice chain representing relative execution environment requirements for that build option parameter, and
  (b) said library selector is formed with components corresponding to a limiting level of execution environment requirements needed by said library of machine code objects; and
(ii) determining from said library selectors that at least one compatible library of machine code entities is present for each possible combination of build option parameters of said source code entities.

This aspect of the invention exploits the ability of a lattice theory model of execution environment requirements (compatibility) to enable a rigorous determination to be made that at least one library that will work is provided for every possible combination of build option parameters.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
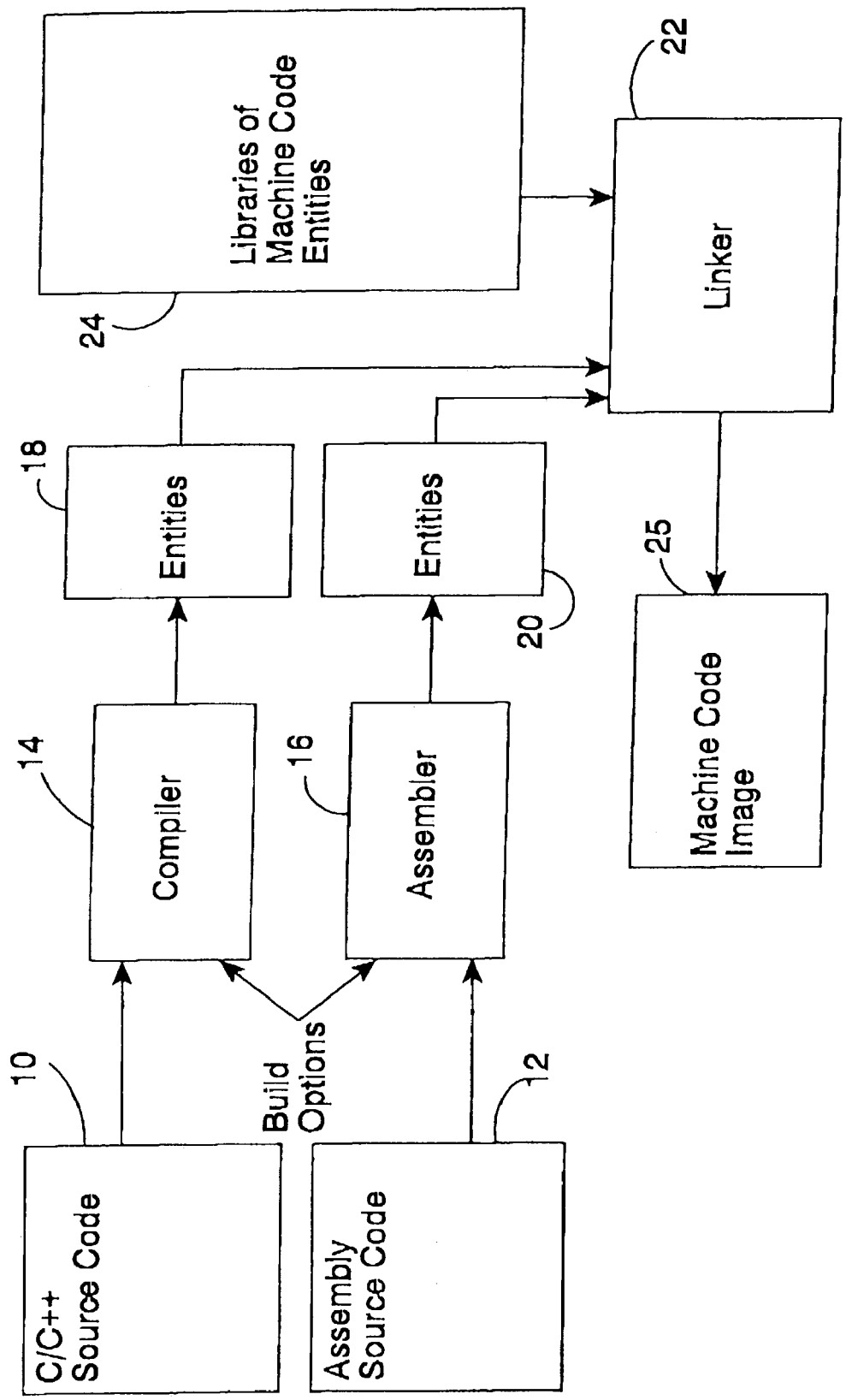
FIG. 1 schematically illustrates the process of generating a group of machine code entities from source code using libraries of machine code entities.

FIG. 1 illustrates the use of a software development tool system for forming machine code for a target processing apparatus from source code. A software developer may write a mixed program comprising some C or C++ source code 10 and some assembly language source code 12. This source code 10, 12 together with the user selected build option parameters are supplied as inputs to a compiler 14 and an assembler 16 respectively. If a user does not specify the build option parameters to be used with a particular source code object, then the compiler 14 or the assembler 16 may use its own default values for those particular build option parameters.

Specifically, in this embodiment all objects have "build option parameters" associated with them. These are derived in 3 ways:

Objects built by attribute aware object producers have a BuildAttributes$ . . . string. Entries in it correspond to:
  Options explicitly requested by a user.
  Options implicitly assumed by the object producer.
Objects built by attribute-oblivious object producers (older releases of the SDT (Software Development Toolkit) for example), nonetheless get build option parameters associated with them based on what can be inferred about their build options from, for example, the library requests they make.

The whole system has been designed so that, in general, if an object is completely devoid of build attributes—built by an alien, attribute-oblivious object producer—it will link in the most common modes of usage (most common choices of build option parameters) by virtue of have a "bottom" as the relevant components of its selecting vector. Of course, such linkage is at the user's risk, and little can be diagnosed about it, so it cannot be guaranteed to produce a working binary!

The compiler 14 and assembler 16 translate the input source code 10, 12 to source code entities 18, 20 (i.e. the entity derived from the corresponding source code such as a file, section or symbol). These groups of source code entities 18, 20 represent the primitive structures from which the computer program as a whole is formed. The groups of source code entities 18, 20 have their respective build options associated with them. In the context of a linker a "source code entity" represents an entity explicitly specified as an input by the user (or by an IDE or "make" system acting as the user's agent), in contrast to entities located automatically by the linker.

The groups of source code entities 18, 20 are supplied as one input to a linker 22. In relation to the mechanism of at least the preferred embodiments of this invention the linker 22 serves the function of identifying an appropriate library of machine code entities within a collection of libraries 24 and then matching the different source code entities to the appropriate machine code entities within the selected library. The output from the linker 22 is a machine code image 25 (group of machine code entities) that forms an executable program upon the target processor apparatus.

Figure 2:
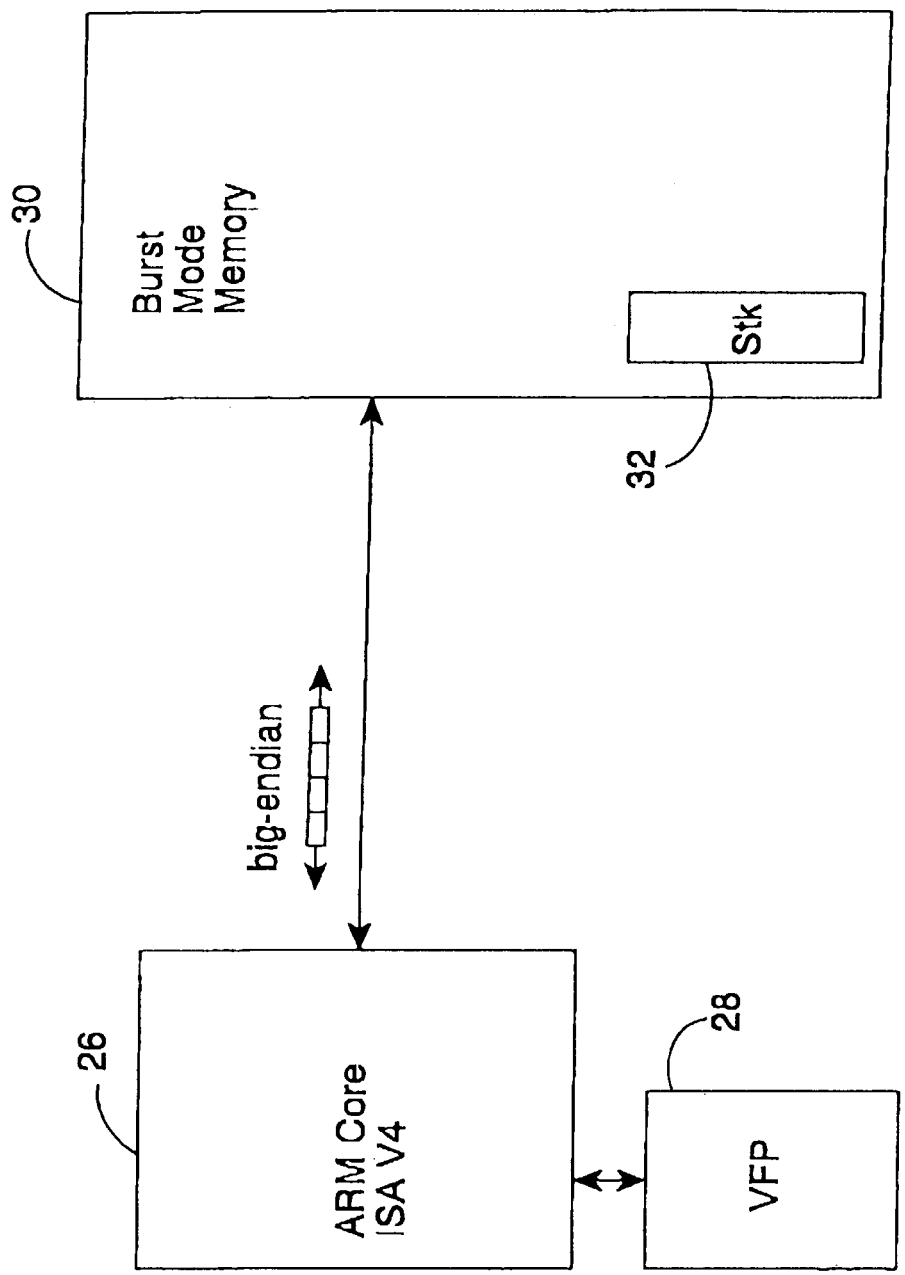
FIG. 2 schematically illustrates a target data processing apparatus having various build option parameters.

FIG. 2 schematically illustrates a theoretical example target processor apparatus. A processor core 26, such as an ARM core produced by ARM Limited of Cambridge, England, is provided at the heart of the system. The processor core 26 will have a particular instruction set architecture that it supports, e.g. the ARM Instruction Set Architecture Version 4. In the illustrated system a vector floating point unit 28 is provided in association with the processor core 26 to provide hardware support for vector floating point instructions. The memory system 30 coupled to the processor core 26 is in this instance a burst mode memory. The memory includes a stack memory area 32, which for the program being produced, has been specified by the programmer to be an unchecked stack memory. The data storage and transfer between the processor 26 and the memory 30 is big-endian.

It will be appreciated that a crude software development tool system could simply provide one library of machine code entities for each major variant assuming the least possible execution environment requirement build options for all minor variants covered by that library, e.g. assume the earliest instruction set architecture knowing that later instruction set architectures will be compatible with this. Compatibility lattices tend to be broad and shallow, so there are many incompatible major variants that are least in the lattice (i.e. above bottom, but not above any other non-bottom element). As an example, there is no least element between big-endian and little-endian, libraries for each must be provided if both are to be supported.

A crude software development system that provided only one major variant library would necessarily have to deny build options able to create other major variant. Thus, a system that provided no vector floating point library would have to preclude generating vector floating point instructions that could take advantage of the vector floating point unit 28.

Another example is that the processor core 26 in the illustrated system supports Version 4 of the instruction set architecture. A later more sophisticated instruction set architecture, namely, Version 5, is supported by different processor cores. If Version 5 were supported by the processor core 26, then more efficient and desirable machine code entities could be used. However, such code would not run on the illustrated target processor. The lattice theory compatibility modelling allows a library containing Version 4 machine code entities to be selected thereby making the most of the capabilities of the system by not merely reverting to a less desirable Version 3 instruction set architecture assumption that would work in all cases.

As an alternative the system may be arranged such that one major variant is selected that contains Version 3 Version 4 and Version 5 machine code entities (minor variants). The lattice theoretic modelling allows the most desirable minor variant to be chosen It should be noted that minor variants are "interface compatible", i.e. there is some execution environment in which any of them could be used, e.g. in the above example a Version 5 environment. Major variants are "interface incompatible", i.e. there is no execution environment in which the variants are interchangable, e.g. big-endian and little-endian are not mixed within an environment.

The stack memory 32 has been user specified as unchecked. If some of the source code objects assume a checked stack, then the linker 22 will flag all incompatibility before the machine code is produced. The user can then adjust the build option parameters or source code accordingly to rectify this incompatibility.

Figure 3:
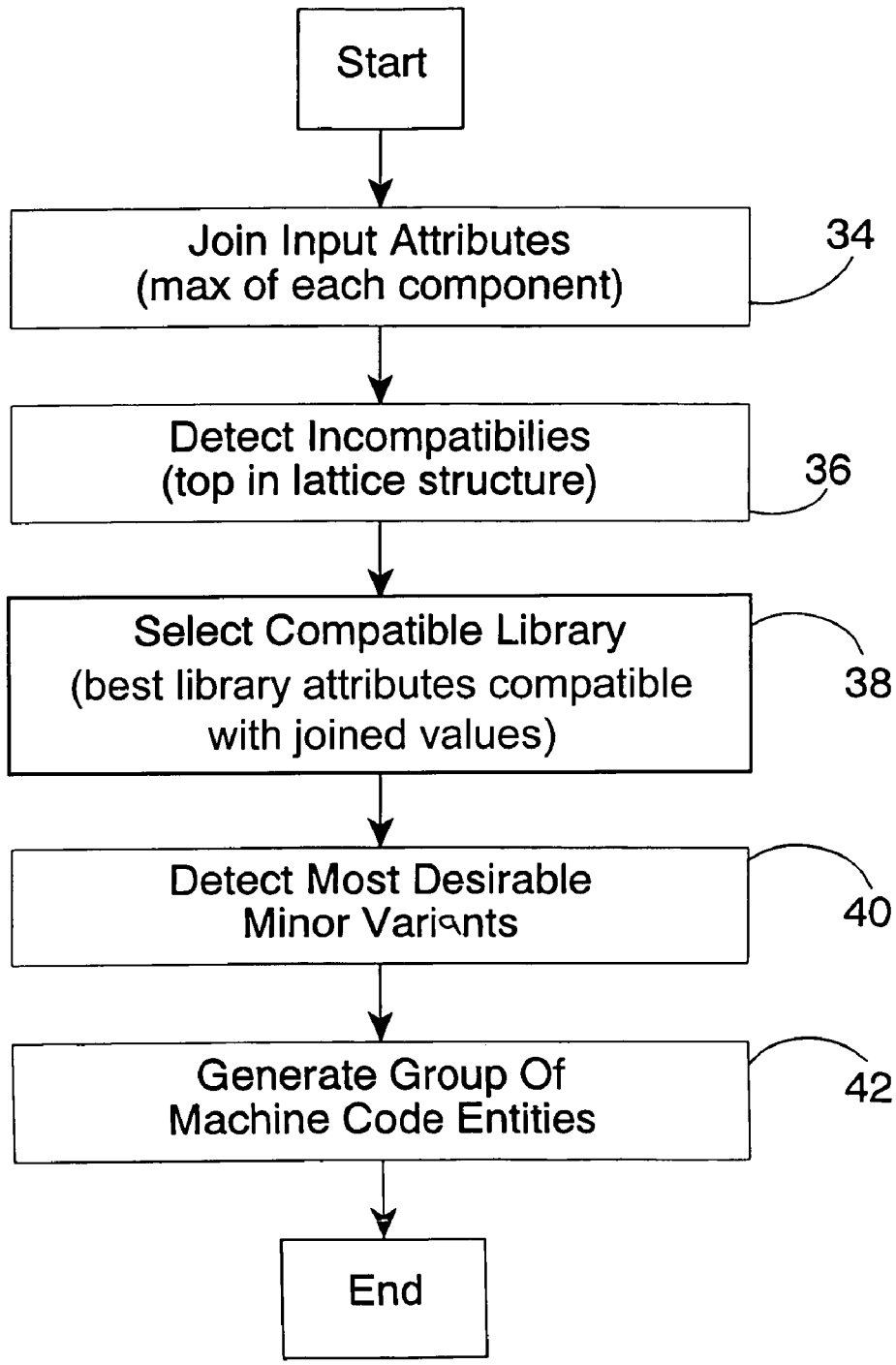
FIG. 3 is a flow diagram illustrating the operations performed by the linker of FIG. 1.

FIG. 3 schematically illustrates a flow diagram showing the operation of the linker 22 of FIG. 1 (the linker is in practice embodied as software controlling a general purpose computer). Each machine code entity has an associated attribute vector encoding its build option parameters in accordance with a lattice theory model of their compatibility and relative desirability. At step 34 the linker 22 joins (in the lattice of all build option related attributes) the input attributes of all of the source code entities. This joined vector becomes the library selector (e.g. using a library selecting vector or a list mechanism) as it specifies the maximum execution environment requirements of the source code entities.

Step 36 serves to identify any incompatibilities amongst the build option parameters specified. As an example, if one source code entity specified an unchecked stack and another a checked stack, then this incompatibility would need to be resolved before the machine code program could be properly produced. In practice incompatibilities might be detected by detecting within the library selecting vector a lattice top in some of its independent components.

Step 38 uses the library selecting vector produced at step 34 to select the particular library of machine code entities within the library collection 24 that is to be used. The particular library selected is the one having the best level of component vector values that are compatible with the component values for the library selecting vector produced at step 32.

Within each library various minor variants may be provided for by providing different machine code entities for those different minor variants. These are detected and selected at step 40.

Finally at step 42 the executable machine code is generated using the machine code entities from the selected library of machine code entities including selected minor variants.

An alternative view of the invention is set out in the following Appendix.

APPENDIX

Contents

ABOUT THIS DOCUMENT

Terms and abbreviations

2 INTRODUCTION AND MOTIVATION

3 LATTICE THEORY AND COMPATIBILITY

3.1 Basic lattice theory
3.1.1 Summary of key definitions and results

3.2 Build options and object attributes
3.2.1 An example attribute lattice
3.2.2 Interpretation of attributes
3.2.3 Modeling user intentions with attributes
3.2.4 Enforcing modeling restrictions by factoring

3.3 Library variants
3.3.1 Library variants, interfaces, and attributes
3.3.2 Library variants and $3^{rd}$-party tools

3.4 Attribute-aware linking
3.4.1 The linking process
    3.4.1.1 The ARM linking algorithm
    3.4.1.2 The attribute-aware linking algorithm
3.4.2 Accumulating image attributes
3.4.3 Finding the best library
    3.4.3.1 Finding libraries to select
    3.4.3.2 Selecting the right libraries
    3.4.3.3 Related libraries
    3.4.3.4 Modeling library relationships with attributes
3.4.4 Finding the best minor variant member in a library

3.5 Structuring the ADS run-time libraries
3.5.1 Byte order
3.5.2 Instruction set and floating-point instruction set
    3.5.2.1 Integer instruction set
    3.5.2.2 ARM only, or Thumb mostly
    3.5.2.3 Floating point instruction set
3.5.3 Procedure call standard
    3.5.3.1 Inter-working
    3.5.3.2 Read-only position independence
    3.5.3.3 Read-write position independence
    3.5.3.4 Shlclient, nousev6, usev6
    3.5.3.5 Shl, shl1, and shl2

3.5.3.6 Swstackcheck, swstna, nousev7, and usev7
3.5.3.7 Chunkedstack
3.5.3.8 Ospace and Otime
3.5.3.9 Full IEEE754 floating-point arithmetic
3.5.4 Memory-access capabilities
3.5.4.1 Describing memory access capabilities
3.5.4.2 Minimum feasible requirements
3.5.4.3 The user default
3.5.4.4 The run-time library default
3.5.4.5 Memory access capabilities and regions of memory 3.6 Implementation details
3.6.1 Encoding attributes in ELF objects
3.6.1.1 Architectural attributes (integer)
3.6.1.2 Architectural attributes (floating point)
3.6.1.3 Procedure call standard attributes—set using –apcs /option/option/...
3.6.1.4 Memory access attributes
3.6.1.5 Memory access regions and designators
3.6.1.6 Memory access types
3.6.2 Encoding base attributes in library names Terms and abbreviations This document defines terms and abbreviations at the point of first use.

1 SCOPE

This design document describes:

A lattice-theoretic model of compatibility between object modules built with different build options.

Application of that model to reasoning about and reducing the number of variants of a binary library shipped with a software development product.

Use of the model by a linker to detect and diagnose incompatibilities between differently built object modules.

Use of the model by a linker to choose the best:
  - Variant of a library to link with from among a set of candidate variants.
  - Library member from among a set of compatible members within a library.

2 INTRODUCTION AND MOTIVATION

A software development toolkit (SDT) such as the *ARM Developer Suite* (ADS) presents its users with many build options. For example, ADS can build code for:

Five target architectures encompassing two instruction-sets.

Forty-five distinct target processors that execute these instruction sets. The choice of processor sometimes affects code generation and optimization beyond the underlying choice of instruction-set architecture.

Three major floating-point architectures (actually there are five options).

A cross product of procedure-call standards generated by ten or so mostly independent options.

Two target byte orders.

Considered black-box fashion, the cross product of options is intractably large.

A software development toolkit must supply standard libraries to its users. For example, ADS must support:

Floating-point arithmetic.

The ANSI C library.

The ISO C++ library.

For a variety of reasons, we need or want to ship libraries in binary form. For example:

We are not licensed to ship the source of the C++ library to our customers.

Rebuilding a library is tedious and error prone for a customer. Having source invites accidental damage, with consequential hard-to-find faults, and time-wasting support calls.

If we allow libraries to be-built in all possible combinations of build options we must test them in all combinations of build options.

There are essentially three ways to deal with this problem:

> Supply a full cross product of tested libraries (this was considered to be infeasible).
>
> Restrict the options that users can use (but which options should be withdrawn?).
>
> Supply a set of libraries such that no matter what set of build options the user chooses there is a library *compatible* with the choice.

Both viable alternatives require a formal way to reason about compatibility among build option choices, and at least an informal way to attach relative values to particular sets of choices. As we developed these mechanisms it became increasingly clear that tool support would be needed to:

> Detect and diagnose incompatibilities between differently built objects.
>
> Identify the best variant of a library to link with a set of objects.

The latter process is quite complex for a human being, but easy to mechanize within a formal framework.

The remainder of this design note describes:

> The theory we developed, its mathematical foundations, and the intuition behind it.
>
> Its application to reasoning about which library variants to support.
>
> Its application to the automatic identification of libraries and library members by the SDT.

3 LATTICE THEORY AND COMPATIBILITY

Our first, wholly intuitive attempts to reason about compatibility suggested that we were reasoning about partial orders. This led us to investigate lattice theory—the theory of partial orders—as a formal basis for a *calculus of compatibility*.

3.1 Basic lattice theory

We use only *finite* lattices. The remarks we make about lattice theory are implicitly restricted to finite lattices. In this section we describe only the bare essentials and introduce the terminology that will be used in the remainder of this design note. If you want to know more, consult a textbook about lattice theory.

*Important technical terms*

The technical terms introduced in this section that will be used later in this design note are:

| Lattice | Chain | Partial order | Bottom | Top |
|---|---|---|---|---|
| Cross product | Meet | Join | Entailment | Incompatibility |

*Basic definitions*

A lattice L is a mathematical structure with the following properties:

> L is a finite set.

There exists a non-reflexive, anti-symmetric, transitive relation (a partial order) on L. Denote this by <.
Denote the reflexive closure of < by ≤, and their obvious reversals by > and ≥.

For any two elements a, b in L, there exists a maximal element m among the set { n in L : n ≤ a and n ≤ b }.
(In other words, there exists m such that m ≤ a, m ≤ b, and for all n such that n ≤ a and n ≤ b, n ≤ m.) We call this the *meet* of a and b, and denote it by (a & b).

Lemma 1: The meet operator is associative and commutative.

Proof: Commutativity is trivial. To prove associativity, consider a, b, c in a lattice L, let m = a & b and n = b & c. We aim to show m & c = n & a. Now m & c ≤ b (since m ≤ b) and m & c ≤ c, so m & c ≤ n. Also m & c ≤ a (since m ≤ a). But if m & c ≤ n and m & c □ a, then m & c □ n & a. Similarly, we can show n & a □ c and n & a □ m, and therefore n & a □ m & c. Hence m & c and n & a are equal, and & is associative.

Corollary: We can form the meet of more than two items, and it is unique and well defined as the maximal element among all elements less than or equal to all the original items.

Corollary: We can form the meet of all elements in a lattice, and arrive at a *bottom* element ⊥ such that ⊥ □ x for all x in L.

Lemma 2: Given a, b in a lattice L, either there is no element c such that c ≥ a and c ≥ b, or the set C of all such c has a minimal element j (such that j □□c for all c in C).

Proof: If there are no such c, we are finished. If there are m such c, consider the meet of all of them, k = (c1 & c2 & ... & cm). Since & is commutative and associative (Lemma 1), k is unique. If we can show k = ci for some i, then k is the required j (since k □□ci for all ci).

Now a □□ci for all ci, so a □□k. And b □□ci for all ci, so b □ k. But k ≥ a and k ≥ b, so k is among the c listed.

So we can define the *join* operator |. For any lattice L, and any elements a, b, the *join* a | b is the minimal element among all elements ≥ both a and b. Clearly the join may not exist, but *only if* there is no element ≥ both a and b (since Lemma 2 excludes the possibility that such elements may exist but not include a minimal one).

Lemma 3: The join operator is associative and commutative where it is defined. That is, a | b is defined if and only if b | a is, and where defined they are equal. And if a | b and b | c are defined, then (a | b) | c and a | (b | c) are either both defined and equal, or both undefined.

Proof: Commutativity is trivial. To prove associativity, consider a, b, c in a lattice L, let j = a | b and k = b | c (assume they both exist). Now the set { x in L : x ≥ j and x ≥ c } is precisely equal to the set { x in L : x ≥ a and x ≥ b and x ≥ c }, which is precisely equal to the set { x in L : x ≥ a and x ≥ k }. Hence j | c and a | k either both exist and are equal (since they are minimal elements of the same set) or both do not exist.

A simple form of a lattice is a *chain*. The order-n chain C[n] is a lattice defined on the first n natural numbers with the obvious < relation. For example, C[4] is { 0, 1, 2, 3 } with 0 < 1 < 2 < 3.

Lemma 4: Any Cartesian product of chains $S = C1 \times C2 \times ... \times Cn$, under the product order relation, forms a lattice.

The proof is easy:

S is finite, clearly. It contains |C1|*|C2|*...*|Cn| elements.

The product order relation is non-reflexive, anti-symmetric and transitive (tedious but easy to prove).

Writing an element a of S as an ordered tuple of chain elements, a = (a1, a2, ..., an) with a1 in C1, a2 in C2, ..., an in Cn: any element k such that k ≤ a and k ≤ b must have k1 ≤ a1 and k1 ≤ b1, ..., kn ≤ an and kn ≤ bn. Thus, construct m with m1 = min(a1, b1), ..., mn = min(an, bn). Clearly all such k are ≤ m. And m ≤ a, m ≤ b, so a & b exists and is m.

Obviously (0,0,...,0) is the *bottom* element ⊥.

Note that a product of chains is a special type of lattice in which the join of any two elements does exist.

*Dependencies and entailments between chains in a cross-product lattice*

We may wish to introduce dependencies between chains in such a lattice. For example, we may wish to introduce an incompatibility between two elements of distinct chains.

Suppose T is a lattice. We say that S is a *restriction* of T if S is a subset of T defined by a list of restrictions of the following two forms:

*Incompatibility*: incompatible(p, q), for p, q in T, means that no element x of T can be in S if both x ≥ p and x ≥ q.

*Entailment*: entails(p, q), for p, q in T, means that no element x of T can be in S if x ≥ p, but not x ≥ q.

Lemma 5: Any restriction S of a lattice T is a lattice.

Proof:

|S| ≤ |T|, therefore S is finite.

The product order on S is a subset of that on T, and must therefore inherit the properties of non-reflexivity (a is not < a), and anti-symmetry (never both a < b and b < a). Transitivity follows from the fact that if a, b are in S, and a < b in T, then a < b in S (which is a little stronger than the order on S being a subset of the order on T). Given a, b, c in S, if a < b and b < c in S, then a < b and b < c in T, hence a < c in T and so a < c in S.

To prove that meets still exist, consider a, b in S. Let their meet in T be m. Clearly if m is in S, a & b exists in S and is m. Now for each restriction that defines S from T:

- If incompatible(p, q) prevents m being in S, it must be because m ≥ p and m ≥ q. But a ≥ m; so a ≥ p and a ≥ q and therefore incompatible(p, q) would also prevent a being in S, contradicting the assumption that we began with a in S.

- If entails(p, q) prevents m being in S, it must be because m ≥ p but not m ≥ q. However, a ≥ m and b ≥ m, so a ≥ p and b ≥ p, and since a, b are in S, we must have a ≥ q and b ≥ q. But if both a and b are ≥ q, then (in T) a & b ≥ q as well! So m ≥ q, contradicting the assumption that m was not ≥ q.

Therefore, for any a, b in S, the meet of a and b in T is also in S, and is the meet of a and b in S.

Theorem 1: Any restriction of a product of chains is a lattice.

Proof: From Lemma 4 (any product of chains is a lattice), and Lemma 5 (the restriction of any lattice is a lattice).

Theorem 2: Any lattice L can be written as a restriction of a product of 2-chains.

Proof strategy:

Let s1, s2,..., sn be the non-bottom elements of L. (So n = |L| - 1). Assume they are sorted topologically, such that sn is a maximal element (there exists nothing in L greater than sn) and in general si ≤ sj can only hold when i ≤ j.

Let $T = C2 \times C2 \times ... \times C2$ be the product of n 2-chains.

For 1 ≤ i ≤ n, let ti be the element of t whose component in each 2-chain is zero except for the ith chain, in which it's 1. So t1 = (1, 0, ..., 0), t2 = (0, 1, 0, ..., 0), tn = (0, ..., 0, 1). For each ti, let Ti be the multi-way join of all tj such that sj ≤ si. (In particular, ti ≤ Ti for all i.) Let Tb be the bottom element of T.

Now collect a set of restrictions. We need entails(ti, tj) for any pair si, sj such that si > sj, and we need incompatible(ti, tj) for any pair si, sj such that si | sj does not exist, and we also need entails(Ti | Tj, Tk) for any triple si, sj, sk such that sk = si | sj exists.

We aim to show that:

- Ti ≤ Tj if and only if si ≤ sj.
- Tb ≤ Ti for all i.
- The restriction S of T under the given restriction set is precisely the set {T1, ..., Tn} + {Tb}.

This will show that S is a restriction of a product of 2-chains which is isomorphic to L, proving the theorem.

Proof:

If si ≤ sj, then for any k, sk ≤ si implies sk ≤ sj. Thus the set of tk whose join forms Ti is a (not necessarily proper) subset of the set whose join forms Tj, thus Ti ≤ Tj.

Conversely, if Ti ≤ Tj, then since ti ≤ Ti, we must have ti ≤ Tj, whence ti is one of the tk whose join forms Tj, implying si ≤ sj by construction.

Tb is the bottom element of T, so Tb ≤ Ti for all i, clearly.

T1, ..., Tn and Tb are clearly in S. Each one satisfies all the entailments and impinges on none of the incompatibilities.

It remains to prove that no elements of S exist which are not Tb or one of the Ti. To do this, consider a non-bottom element s of S. Considering s as an element of T, let i be the largest j such that tj ≤ s. Now we show that s must be equal to Ti.

Suppose there exists some tj such that tj ≤ s but not tj ≤ Ti. Clearly j < i, by construction of i. The join si | sj must exist, as otherwise we would have incompatible(ti, tj), and s could not be ≥ ti, tj. Now consider Tj | Ti. This is the join of all tm such that sm ≤ sj and sm ≤ si, and therefore is Tk for k such that sk = si | sj. Now k > i since sk > si; and s ≤ Tj (since s must be ≤ all tm that are ≤ Tj, because for all such tm we have entails(tj, tm)) and s ≤ Ti (likewise), so s ≤ Ti | Tj and therefore by entails(Ti | Tj, Tk) we must have s ≤ Tk, contradicting the construction of ti as the largest ti ≤ s.

If that can't happen, the only way s can differ from Ti is that there must be some tj (j != i) such that tj ≤ Ti but not tj ≤ s. Now if tj ≤ Ti, then this must be because sj si (in fact, sj < si strictly). Therefore the restriction set includes entails(ti, tj). But ti ⊑ s and not tj ⊑ s, so by entails(ti, tj) s could not have been in S.

3.1.1 Summary of key definitions and results

A lattice is a finite partially ordered set in which meets always exist. Meets are commutative and associative. Every lattice has a bottom element (denoted by ⊥).

Joins need not exist, but when they do exist they are well defined, commutative and associative.

You can *restrict* any lattice using entailments (any element ⊑ ⊓a must also be ⊑ ⊓b) and incompatibilities (no element may be both ⊑ ⊓a and ⊑ ⊓b), without it ceasing to be a lattice.

Every lattice is isomorphic to (can be represented as) a cross product of 2-chains under some restrictions, and every cross product of (not necessarily 2-) chains under restrictions is a lattice.

3.2 Build options and object attributes

When an object is built (compiled or assembled) it acquires *build attributes* that abstract the choice of build options. Attributes are an abstraction used to reason about (in-) compatibility. A concrete *representation* of an object's attributes is stored in the object itself so that its attributes are manifest to tools that consume it.

Sometimes the build options presented to users directly represent build attributes, and sometimes they do not. For example, one option choice can affect more than one attribute, and selecting an option can remove an attribute. Attributes are designed for reasoning about (in-) compatibility, and their machine representation within the tool chain is designed to support lattice operations conveniently. In contrast, build options are designed to appeal intuitively to tool-chain users, and attribute representation in an object is both constrained by the carrier file format and designed for efficiency of (bi-directional) translation.

Build attributes are also inferred from library names (the motivation for this is given later).

Figure 4:
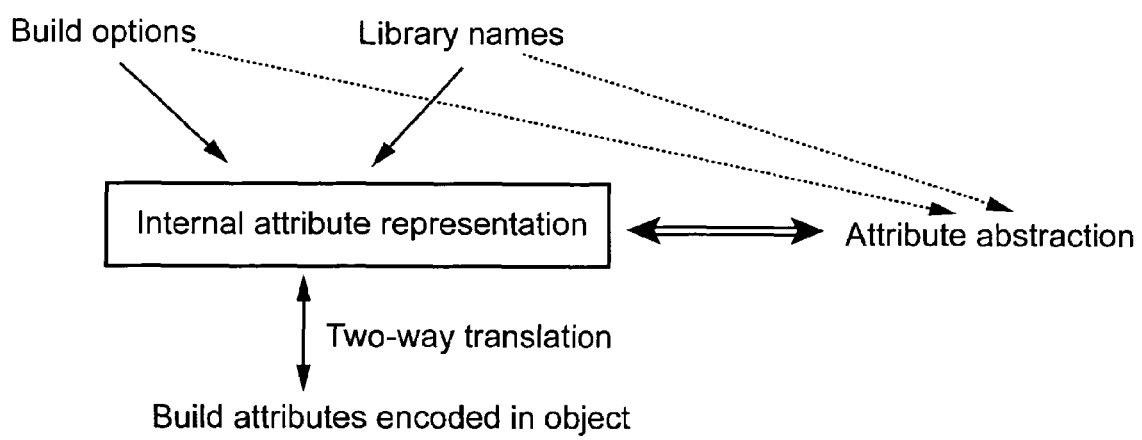
FIG. 4 is a schematic of how build options may be specified.

In effect, there are several external representations of build attributes, not all of which represent the underlying abstractions 1-1. Schematically this can be seen in Figure 4.

*The meaning of object attributes*

In practice, we use attributes to model demands or requirements that an object, an object section, or a function will place on its execution environment. For example, we might be able to build an object for any one of several backwards-compatible instruction-set architectures. In that case we would give it the attribute corresponding to the architecture it was built for, in the expectation that any later architecture could also execute it

3.2.1 An example attribute lattice

As a concrete example, we model the different versions of the ARM instruction-set architecture as an attribute lattice generated from a cross product of attribute chains.

Today, there are three current (not obsolete) base versions of the ARM instruction-set architecture, each compatible with its predecessor. There are two base versions of the Thumb instruction-set architecture. Extended multiplication capability can be added optionally to each of the five base versions. ARM versions can also support the obsolete (versions 1 and 2) 26-bit mode, but this is incompatible with Thumb capability. Thumb version 1 requires ARM version 4, and Thumb version 2 requires ARM version 5.

More formally, as an implicit cross product of chains:

$ARM\_ISAv3 < ARM\_ISAv4 < ARM\_ISAv5$ (the ARM instruction-set chain)

$\perp < Thumb\_ISAv1 < Thumb\_ISAv2$ (the Thumb instruction-set chain)

$\perp < M$ (the extended multiply chain)

$\perp < Z$ (the 26-bit mode chain)

$Thumb\_ISAv1 \Rightarrow ARM\_ISAv4, Thumb\_ISAv2 \Rightarrow ARM\_ISAv5$ (entailment rules)

$Thumb \diamond Z$. (incompatibility rule).

The entailment and incompatibility rules determine which elements of the cross product can exist. For example, of the 9 ARM and Thumb combinations, only the following 6 survive the Thumb entailment rules:

$<ARMv3, \perp> < <ARMv4, \perp> < <ARMv5, \perp>$ $<ARMv4, Thumbv1> < <ARMv5, Thumbv1> < <ARMv5, Thumbv2>$ Of these 6 combinations, only one has not been used in a real product, namely <ARMv5, Thumbv1>. In practice, this is not a desirable combination, and we can eliminate it by adding the entailment:

$ARMv5 \Rightarrow Thumbv2$

Adding M into the cross product simply doubles the number of (non-$\perp$) variants. 26-bit capability (the Z attribute) can combine only with the 3 <ARM..., $\perp$> elements, but it too doubles the number of (non-$\perp$) variants. In total, there are $((3 \times 2) + 2) \times 2 = 16$ lattice elements.

The interested reader should try drawing the lattice conventionally and labeling its nodes with the appropriate ARM architecture designations such as 3, 4, 4TxM, 3M, 5, etc.

3.2.2 Interpretation of attributes

At this point, it should be becoming clear that A < B means:

A places fewer demands on its execution environment than B.

A is more compatible (or less incompatible) than B.

Under this interpretation if <, elements higher up an attribute chain model less compatible choices.

A less obvious intuitive interpretation of <, needed in following sections, is that A < B means A is *less desirable* than B. We need this interpretation to underpin automated library selection. We want a tool chain to select the "most desirable compatible library", and in order to do this we must formalize both "compatible" and "desirable".

To an extent, desirability *must* increase as compatibility decreases. To understand why, observe that if A < B meant A is *more* desirable than B, B would be both less compatible and less desirable—surely redundant in a real product! However, we need to be careful with this interpretation. If we are too naïve, there is an anomaly in it that will trap us To understand why, consider the meaning of ⊥< B. Paraphrasing the above:

B places more demands on its execution environment than no use of B (true!).

B is more desirable than no use of B (... questionable...).

The second assertion is only sometimes true. Consider these examples from the ARM architecture lattice described in section 3.2.1, *An example attribute lattice*:

⊥< M

⊥< Thumb_ISAv1

It is intuitively clear that it is unconditionally advantageous to use the extended multiplier if it is available. Using it has no disadvantages. On the other hand, it is also clear that it is *not* unconditionally better to use the Thumb instruction set[1], even though it would be unconditionally better to use Thumb_ISAv2, rather than Thumb_ISAv1, if it were available and Thumb were being used.

As we shall see, with little inconvenience, we can always think of desirability and compatibility being inverse interpretations, except when they relate to use, rather than no use, of a facility or feature.

*Interpretation of bottom and top*

When we use ⊥ *explicitly* to name the least element of an attribute chain (rather than to denote the least element in a lattice), we use it to mean "makes no (sometimes minimal) demands on the execution environment".

When there is explicit top element T in a lattice, we usually intend it mean "makes impossible demands on the execution environment". That is, T usually represents erroneously joined attributes. Moreover, in these design notes we will often use T loosely to denote those cases where no join exists. Because we only use finite lattices, we could always add an explicit T element to the underlying lattice and *define* non-existent joins to be T.

In the implementation of a join operator, it is equally satisfactory to return a value denoting that no join exists, or to return a distinguished T (error) value. In practice, both denote error conditions to be diagnosed. We usually do the former.

For example, no ARM program can be simultaneously big and little endian, so the join of attributes modeling these demands must be T, or must not exist. For simplicity of exposition we will use T in these notes.

3.2.3 Modeling user intentions with attributes

The observations of section 3.2.2, *Interpretation of attributes*, are important to modeling with attributes. Suppose a user of the SDT selects as target processor ARM7TDMI. This processor supports use of the features modeled by the attributes:

<ARM_ISAv4, Thumb_ISAv1, M>

---

[1] The Thumb version of a function can be slower than the ARM version.

It is clearly the intention of the user that these features should be available (otherwise some other processor would have been chosen), but, this alone does not tell us which attributes to attach to an object built with this build option. We must examine the interpretation of the attribute chains more carefully. Observe:

> Any program containing code must use at least ARM_ISAv3 (there is nothing less). Arguably, a program with no code is not a program, so adding an explicit $\perp$ to the ARM instruction-set component of its attributes cannot be useful. So, we should give a derived object the ARM_ISAv4 attribute, unconditionally, and independently of whether any ISAv4 features are actually used or not. The user intends these features to be available, and using them is always better than not using them, so ARM_ISAv4 models the best, compatible attribute for any program containing this object.

> A similar argument tells us we should give the object the M attribute, even if it does no multiplication.

> Because using Thumb capability is *not* unconditionally advantageous[2], we cannot infer from its availability alone that the user intends to use Thumb. In effect, the object must be given the Thumb_ISAv1 attribute only if it really does use Thumb instructions (this being clear evidence of the user's intent).

Thus there are two sorts of object attributes:

> Unconditional attributes, given to model a user's intentions about the availability of features in the execution environment.

> Conditional attributes given to model the demands *actually* made by an object on its execution environment.

The two sorts arise because the two interpretations we need of A < B do not align perfectly. In particular, we noted that using a feature is not always better than not using it. This shows up in the attribute model as a failure of the interpretation of A < B as "B is more desirable than A", when A is $\perp$.

3.2.4 Enforcing modeling restrictions by factoring

To simplify modeling with attributes, we would like to deal with conditional attributes only in the way described above. That is, as use or non-use of a feature modeled by an attribute chain.

Suppose, however, that we discover a chain in which A is unconditionally better than $\perp$, A < B, but B is only sometimes better than A. To restore the modeling invariant we want, we must factor the chain so that:

A = <A', $\perp$>, B = <B', b>

You can always do this in a trivial way under the interpretation of B' as "feature B is available" and b as "feature B is used". Now A' < B', unconditionally, in both interpretations.

3.3 Library variants

We have always used in an intuitive way the concept of a *major variant* of a library. Intuitively, two major variants are so different to one another that there can be no practical benefit from merging them. A merged library would simply be the aggregate of the two libraries.

We have also hankered after merged *minor variants*. Intuitively, two minor variants are so similar that a merged library would eliminate duplicate members.

---

[2] Its advantage depends on the memory organisation, and on whether the user favours size over speed.

A good example of major variation is given by target byte order. A library built for one byte order differs in every member[3] from one otherwise identically built for the other byte order.

The C library built for ARM architecture versions 3 and 4 gives a good example of minor variation. The relevant difference between version 3 and version 4 is the availability of half-word instructions. Within the ANSI C library, only the internals of printf and scanf use half-words[4], so only these members would differ between a build for version 3 and a build for version 4.

3.3.1 Library variants, interfaces, and attributes

A more precise, and useful, way to define library variation is in terms of interface compatibility.

Two variants of a function are *interface compatible* if there is an execution environment in which either could be used. Otherwise, if there is no execution environment in which they can be used interchangeably, they are *interface-incompatible*.

Contrast, for example:

Some function F built for ARM_ISAv3 and ARM_ISAv5 (with all other build attributes the same), F built big endian and F built little endian (with all other build attributes the same).

In the first case, the two variants of F are clearly interface-compatible, because both versions can work on an ARM_ISAv5-capable target. In the second case, the versions of F are not interface-compatible, because there is no target on which both big-endian code and little-endian code can be executed simultaneously.

These observations presuppose that the demands an object makes on its execution environment are honestly represented in its build attributes. The above paragraph's parenthetic remark "with all other build attributes the same" is crucial. For example, if the choice of ARM_ISAv5 were to change the way that code is generated so that the two variants of F became interface incompatible, we would require this to be reflected in the build attributes.

We can formalize these observations lattice-theoretically by observing that F having vector of attributes $\underline{A}$ is interface compatible with F having a vector of attributes $\underline{B}$ if an only if $(\underline{A} \mid \underline{B})$ exists and is $\neq \top$. That is, the two variants are interface compatible only if the join of their attributes is well defined and not top in the attribute lattice.

As corollaries, we can immediately see that:

If the only variation is within an attribute chain, the variants are interface compatible.

If variation involves more than one attribute chain and the cross product attributes are not comparable (so their join does not exist, or is $\top$), the variants are not interface compatible.

Interestingly, this tells us that we should model big endian and little endian as two attribute chains. We know this anyway, because if they were attributes within a single chain, one would be compatible with the other one. In the endian lattice, $\bot$ models "no byte order requirements are placed on the target execution environment". This is precisely the case for an object that is a sequence of bytes, with no word structure.

---

[3] Save that a library member consisting only of a sequence of bytes is identical in both byte orders.

[4] In ADS, neither member uses half-words directly in its implementation, but the point is illustrative.

So, we can equate *major variant* with *interface incompatible* and *minor variant* with *interface compatible*, and model both intuitive concepts lattice theoretically.

3.3.2 Library variants and $3^{rd}$-party tools

In practice, we need to separate major variants into separate library files in deference to $3^{rd}$-party tools.

A linker should not need to be attribute aware in order to link objects with a library named explicitly by a user. Attribute awareness should be used only to identify automatically the right, or best, library to link with, so separate library files should not contain interface-incompatible members.

Minor variation is a different matter. In this case there is no work around for a $3^{rd}$-party linker that is oblivious to attributes. The best we can do is to ensure that a $3^{rd}$-party linker will extract the most compatible variant of a member—the *base* member—and be oblivious to more desirable variants.

3.4 Attribute-aware linking

In this section we outline how attributes affect the process of linking object files into an executable image. At this level of detail, the process is very simple.

3.4.1 The linking process

A linker accepts as input:

A non-empty, ordered list of object files.

A possibly empty, ordered list of library files.

It may also use a set of standard libraries that are not explicitly mentioned in the list of inputs to the linker. This set may be ordered, or not, and it may be very implicit or not at all implicit. At this level, details differ between linkers and are different among, for example, Unix ld, MS VC++ Link, and armlink.

3.4.1.1 The ARM linking algorithm

The linking algorithm used by the ARM linker is:

Add the input objects to the image.

Library searching: While there are undefined symbols, until no more symbols become defined,
        for each undefined symbol S,
            search the libraries in order for a member M defining S,
                and, if found, add M to the image.

If there are undefined symbols, add the implicitly requested libraries to the end of the library list.

Repeat *library searching*.

Important properties of this algorithm are:

A reference to S will always be satisfied from the earliest library defining S, even if the reference to S is from a member loaded from a library later in the list.

There is no defined order among the implicitly requested libraries. In practice, we ensure that the implicitly requested libraries are disjoint (define disjoint sets of symbols), so their order cannot matter.

3.4.1.2 The attribute-aware linking algorithm

Attribute awareness modifies the basic algorithm as shown italicized:

Add the input objects to the image, *accumulating the image attributes*.

Library searching: While there are undefined symbols, until no more symbols become defined,
    for each undefined symbol S,
        search the libraries in order for a member M defining S,
            and, if found, add M to the image, *accumulating the image attributes*.

If there are undefined symbols, *find the best implicitly requested libraries consistent with the image attributes*, and add them to the end of the library list.

Repeat library searching.

3.4.2 Accumulating image attributes

Image attributes are accumulated using the following algorithm:

Initially: image attributes = $\perp$.

Step: image attributes = image attributes | object build attributes (*join* the attributes).

Check-1: if the join does not exist, diagnose the incompatibility.

Check-2: if searching implicitly requested libraries,
    and the attributes used to select the implicit libraries have increased since they were selected,
        diagnose the inconsistency.

At each step, an object's build attributes are joined with the image attributes. If the join does not exist (or is T), an incompatibility has been found.

At the instant we choose which implicitly requested libraries to link with, we should freeze the image attributes on which the choice was based. If we do not do this, a library choice could be invalidated by a later member selection (perhaps from an earlier explicit library!). Backtracking would be required, and termination of the library-searching algorithm could become an issue. We can avoid this by freezing those attributes on which selection depends.

3.4.3 Finding the best library

The linker looks for implicitly requested libraries if there are unresolved symbols remaining after searching the libraries named by the user. At this instant, the linker has accumulated a set of image attributes that represent:

The user's intentions about the availability and use of target features.

The program's actual use of target features that are conditionally beneficial.

As explained in section 3.2.2, *Interpretation of attributes*, an attribute represents an intention about the availability *and* use of the feature it represents if using the feature is unconditionally better than not using it. Otherwise, it represents the actual use of a permitted feature.

As also explained in section 3.2.2, $\underline{A} < \underline{B}$ means that $\underline{B}$ is both more desirable than $\underline{A}$, and less compatible than $\underline{A}$.

Intuitively, the best library to link with is the most desirable one compatible with the image. In more formal terminology, the best library is the one with the greatest attributes not exceeding the image attributes.

(Object producers deal with conditional benefit, so at link time compatibility and desirability are exact inverses).

3.4.3.1 Finding libraries to select

As a matter of implementation detail, there is a set of standard places containing libraries. We use a single root place containing two sub-directories. This organization is entirely an implementation convenience. Fundamentally, a single place suffices, but any number of places can be used. Our two sub-directories contain, respectively, libraries containing:

- Low level run-time functions, floating-point arithmetic functions, C library functions, and math functions.
- C++ library functions.

ARM C compilers and assemblers mark the objects they produce as potentially needing functions from the set of libraries contained in the run-time library sub-directory. ARM C++ compilers also mark the objects they produce as potentially needing functions from the set of libraries contained in the C++ library sub-directory.

As objects are added to an image, up to and through the first phase of library searching, the linker accumulates the set of standard places in which to look for implicitly requested libraries.

3.4.3.2 Selecting the right libraries

The linker enumerates the libraries contained in each place containing standard libraries. With each library is associated a set of *base attributes*. Hitherto, we have discussed the complete attribute lattice formed from the cross product of all attribute chains. The base attribute lattice is formed from the cross product of some attribute chains—just those relevant to distinguishing library major variants (see section 3.3, *Library variants*). Each member of a library has the same base attributes, and in each non-base attribute chain, the attribute associated with the library is $\bot$ (but note that the members of the library may nonetheless have a non-$\bot$ value for non-base attributes). The selection algorithm is:

Initially: selected-libraries = { }.

Step: if this-library's attributes ≤ image-attributes,
    for each L in selected-libraries *related to* this-library
        if this-library's attributes > L's attributes, remove L from selected-libraries
        if this-library's attributes ≤ L's attributes, done step,
    add this-library to selected-libraries.

The key features of this algorithm are:

There are separate subsets of *related* libraries. This is explained further below. It is a product naming convenience that could be modeled using additional attributes.

The algorithm removes all previously selected libraries *dominated* by a new candidate. Note that it is possible for L > L1 and L > L2, but neither L1 ≥ L2 nor L2 ≥ L1 (L1, L2 unordered).

3.4.3.3 Related libraries

To understand the intuition underlying sets of related libraries, consider the ARM run-time library. It contains:

Floating-point arithmetic functions.

Math functions.

Non floating-point C library functions.

The floating-point arithmetic functions have no static state, and any call chain through them uses less than 256 bytes of stack. In effect, each public interface behaves like a stateless leaf function. These functions do not need to be built in stack-checked and not stack-checked variants—one variant is compatible with both checked and unchecked clients. Similarly, no read-write position-independent (RWPI) variant is needed—one variant is compatible with both RWPI and not RWPI clients.

So, we can reduce by a factor of four the number of FP arithmetic libraries we need to build.

Math functions have no static state, but still need to be stack checked, or not. So, we can halve the number of math library variants. On the other hand, there are four different FP targets.

In general, non floating-point C library functions need to be built in the four variants {RWPI, ~RWPI} X {stack-checked, not-stack-checked}, but there is only one FP variant of them (no use of FP). So the number of C library variants can be quartered.

By considering "The Run Time Library" to be three sub libraries, we can drastically reduce the duplication of identical library members. This optimization reduces the size of delivered libraries, and reduces the time taken to build and test a full set of libraries.

3.4.3.4 Modeling library relationships with attributes

While it convenient and intuitive to base the relationship between libraries on their names—similarly named libraries belong to the same library family—it is also easy to model this uniformly with attributes. Let's introduce three new attribute chains, $\{\perp, f\}$, $\{\perp, m\}$, and $\{\perp, c\}$. Extend the library attributes with their cross product so that C libraries have the attributes $<c, \perp, \perp>$, FP libraries $< \perp, f, \perp>$, and math libraries $<\perp, \perp, m>$. Clearly, these three cross-product attributes are unordered, so the *related to this-library* predicate is no longer needed by the library selection algorithm. A simple comparison of a longer attribute vector suffices.

So, again, a simple intuition can be described formally using an attribute lattice.

3.4.4 Finding the best minor variant member in a library

An attribute-aware librarian makes a library containing minor variant members.

As a simple example, consider a library containing a divide routine written in ARM code. The routine can benefit from using the CLZ instruction of ARM_ISAv5, but not all targets can execute v5 instructions. So, we build a library containing ARM_ISAv3 base members, and an ARM_ISAv5 minor variant divide member.

A librarian oblivious of attributes will either create a library containing both members, putting two definitions of *divide* in the library's symbol table, or will fault the ambiguous definition of divide. An attribute aware librarian puts both variants in the library, but enters the more attributed variant into the symbol table under a different name. For example, it might use __div and $ARM_ISAv5$$__div[5].

When it uses this library, a linker oblivious of attributes will see two independent symbol definitions. However, a reference to the decorated symbol will cause a definition of the undecorated symbol to be loaded. In practice, a linker oblivious to attributes will never refer to the non-base variants.

An attribute aware linker will read the library's symbol table and notice that it has a base version of __div and an ARM_ISAv5 version of it. If the image attributes contain ARM_ISAv5, the linker can use the variant member to satisfy a reference to __div, otherwise it must use the base variant member (undecorated symbol).

More generally, for each symbol in the library symbol table, the linker can calculate a vector of attributes $\underline{A}$ and a symbol name S. For each such S the linker keeps the definition with the greatest attributes not exceeding the image attributes.

*Implementation details and the underlying abstraction*

Where and how the attributes of minor variant members are recorded are implementation details. Many alternative implementations exist of the same requirements, namely that:

> The library must contain several variants of the same member, each defining the same symbols.
>
> It must be possible to distinguish (somehow) differently attributed variants of the same symbol.

The implementation most friendly to $3^{rd}$-party tools is the one that:

> Does not change the library format or the library symbol table format.
>
> Makes the base variant of variant members accessible to a linker that is oblivious of attributes.

These considerations effectively mandate that the difference between a variant member's attributes and the library's base attributes be used to decorate the library symbol-table entries for the definitions of symbols defined by variant members. In this way:

> Symbols defined in base members appear as-is in the library symbol table, as expected by $3^{rd}$-party linkers.
>
> Symbols defined in variant members are made invisible to $3^{rd}$-party linkers by renaming them in a way that is forbidden to users (here, using names containing dollar characters, but this detail is specific to the tool chain).

3.5 Structuring the ADS run-time libraries

In this section, we explain concretely the modeling decisions underlying the structure of the ADS run-time libraries.

Historically, there have been three sources of library variation driven by the user's choice of:

> Byte order.
>
> Instruction set and floating-point instruction set.
>
> Procedure-call standard.

To these we will add the choice of:

---

[5] Names containing '$'s are reserved to ARM, so no user symbol can clash with a minor variant name.

Memory-access capabilities.

This is a natural, intuitive division of concerns, and we follow it in the subsections of this section.

3.5.1 Byte order

As we have already observed in section 3.3.1, *Library variants, interfaces, and attributes*, the two byte-orders spawn interface-incompatible major variants. We ignore the very special case of an object that contains only a sequence of data bytes. Strictly, such an object has no byte order. However, such objects are so rare (there are none in our run-time libraries) that duplicating them in both variants costs less than handling a third variant.

The extension of a library name denotes its byte order—dot-l for little endian and dot-b for big endian.

3.5.2 Instruction set and floating-point instruction set

When you use the development tools, you can select a target processor, or target architecture. In each case, your selection determines the availability of an ARM instruction-set variant, and, perhaps, a Thumb instruction-set variant. In a few cases (for example, ARM7500FE, ARM10200), the choice also determines the availability of a floating-point instruction set. In all other cases, you can choose the floating-point instruction set independently. You choose to use the Thumb instruction set by invoking a Thumb compiler or by writing Thumb assembly language. Otherwise you use the ARM instruction set.

3.5.2.1 Integer instruction set

As we showed earlier, with one exception, variations within the processor architecture chains spawn minor variants of libraries. The exception is, of course, the use of Thumb capability, where the transition from no use of Thumb ($\perp$) to using Thumb (THUMB_ISAv1) induces a major variation. To understand why this is so, you need to:

Recall the definition of interface compatibility given in section 3.3.1, *Library variants, interfaces, and attributes*.

Understand how functions are called in the ARM and Thumb instruction sets.

Thus informed, it will be clear that there is no execution environment in which a Thumb version of a function and an ARM version of the same function can be used interchangeably, in a straightforward manner. Without using an intermediate veneer, the caller of the Thumb function must be different to the caller of the ARM function, so the ARM and Thumb variants are interface incompatible[6].

This conclusion is aligned with our intuition, and historical practice, that ARM and Thumb spawn major variants.

*ARM-Thumb inter-working*

To support calling between ARM code and Thumb code, a called function must be able to return to the instruction-set state of its caller. We insist on this because it is always possible—and usually cheap—to insert a tail continued veneer between a call site and a called function to change instruction-set state during the call. Unfortunately, it is not always possible (and

---

[6] Of course, in architecture 5T, a linker able to transform between BL and BLX can effectively remove this incompatibility usually expensive) to intercept returns. So, in practice, a call is only permitted to change the instruction-set state if the called function can restore it. In ARM terminology, the called function must be *built for inter-working*.

Practically, *built for inter-working* means that a function must return control using a BX instruction[7]. This instruction does not exist in ARM architecture 3, and its use in architecture 4T costs about 2% increase in code size. This is an acceptable overhead for libraries built for targets that have BX (architecture 4T or better), but it is not an acceptable overhead to impose on all user code (and is not possible in architecture 4 and earlier).

*Cost of inter-working in the SDT 2.5 ARM and Thumb C libraries*

|  | Code size | Inline data | Inline strings | Const data | RW data | 0-Init data | Code ratio | % increase |
|---|---|---|---|---|---|---|---|---|
| Armlib.32l | 61892 | 1072 | 1896 | 1544 | 1200 | 1360 | 1.000 |  |
| Armlib_i.321 | 63208 | 1072 | 1896 | 1544 | 1200 | 1360 | 1.021 | 2.1% |
| Armlib.16l | 42248 | 1756 | 1564 | 1428 | 1216 | 1616 | 1.000 |  |
| Armlib_i.16l | 43044 | 1756 | 1564 | 1428 | 1216 | 1616 | 1.019 | 1.9% |

3.5.2.2 ARM only, or Thumb mostly

It is clear that base variants of the run-time libraries must to be built for:

ARM_ISAv3 (which cannot inter-work).

THUMB_ISAv1 (built for inter-working).

Within the architecture lattice, there is a third candidate base variant:

ARM_ISAv4T (built for inter-working).

This would be needed to support linking a mixed ARM-Thumb application using an ARM library.

It seems clear that:

An ARM-only application should (and often must) be linked with an ARM library.

A Thumb-only application should be linked with a Thumb library.

Note that because all Thumb-capable processors can execute ARM instructions and can inter-work, it is architecturally acceptable for some members of a Thumb library to execute in ARM-state (but not conversely). This can be an implementation decision, or perhaps a minor variant decision based on optimizing for speed rather than space. So, the basic question remains: "What is the user's intent when a mixture of ARM and Thumb objects are linked together?" The underlying lattice model cannot help us.

---

[7] ARM architecture 5T gives additional ways to do this, but BX is the only option in 4T.

We have observed that, in practice, users build applications entirely in ARM-state—because they are building for a processor without Thumb capability, or because they are concerned primarily with performance—or they build applications mostly in Thumb-state—because they are concerned primarily with code size. We do not see applications built mostly in ARM-state, with a smattering of Thumb.

This suggests that if we can separately address concern for space or speed, we can drop the third major variant.

We have done this in ADS-1.0.

*Managing a third variant (ARM mostly)*

To reinstate the third major variant, introduce another (binary) attribute chain denoting preference for ARM over Thumb. The ARM_ISAv4T inter-working library would have this attribute. To exercise this choice, a user would (somehow) add the attribute to one or more of the input objects (perhaps by using a build option).

Everything else—library location and member selection—would work uniformly as previously described, because this library would dominate the ARM_ISAv3, non inter-working library in the attribute lattice, while being incomparable with the THUMB_ISAv1, inter-working library (see section 3.4.3, *Finding the best library*).

3.5.2.3 Floating point instruction set

At the present time, there are two floating-point instruction sets, FPAv3 and VFPv1. These are fundamentally incompatible because their instruction codes overlap, and because they order the two words of a double-precision value differently in a little endian memory system.

This poses a problem for floating-point arithmetic support in software—with what should it be compatible? We *choose* to implement two version of software floating point, one compatible with VFP and one with FPA.

There are many ways to model these possibilities with attribute chains. We have chosen:

| | |
|---|---|
| Pure endian | ($\perp$, PE) |
| Mixed endian | ($\perp$, ME) |
| VFP | ($\perp$, VFPv1) |
| FPA | ($\perp$, FPAv3) |

There are five valid lattice entries:

$\perp, \perp, \perp, \perp$      No use of floating-point arithmetic.

PE, $\perp$, $\perp$, $\perp$      Software floating-point arithmetic with pure endian doubles (soft VFP).

PE, $\perp$, VFPv1, $\perp$    Floating-point arithmetic implemented with VFP instructions.

$\perp$, ME, $\perp$, $\perp$      Software floating-point arithmetic with mixed endian doubles (soft FPA).

$\perp$, ME, $\perp$, FPAv3    Floating-point arithmetic implemented with FPA instructions.

Any use of ME with PE generates T[8], denoting an error condition. Similarly, VFPv1 | FPAv3 is T, also erroneous. On the other hand, the join of soft-VFP with VFP is VFP—exactly as one would hope intuitively.

*Library structuring*

To avoid generating a large cross product of libraries, we factor the library into the set of sub-libraries described in section 3.4.3, *Finding the best library*. In that way, there are exactly 10 floating point-arithmetic libraries, 5 for ARM (architecture 3) and 5 for Thumb (architecture 4T). Of the 5 libraries:

- The *no floating-point* arithmetic library is almost empty (it must still contain a dummy initialization function).

- The two hardware floating-point arithmetic libraries provide veneers on the underlying floating-point instruction sets. That is, they implement a software floating-point interface to the underlying floating-point hardware.

- Two libraries implement floating-point arithmetic using ARM instructions (one mixed endian, one pure).

The Thumb libraries are, nonetheless, implemented in ARM code, but provide Thumb entry points that change instruction-set state inline. In this way, the Thumb libraries are efficient for mixed ARM-Thumb programs.

The hardware floating-point arithmetic libraries are used when compatible software floating point and hardware floating-point objects are mixed in the same image. They implement the soft-FP functions using FP instructions.

3.5.3 Procedure call standard

Users of the development tools are presented with the following options controlling the choice of procedure call standard. Not all are implemented in ADS 1.0, but we describe the full set here.

| Interwork | Build code to return to the instruction-set state of its caller. |
|---|---|
| Ropi | Make read-only sections position-independent. |
| Rwpi | Make read-write sections position-independent. |
| Shlclient | Build code that avoids using SB, to allow direct linking with RWPI code. |
| Usev6 | Note that code uses v6 (so it cannot link directly to RWPI code). |
| Shl, Shl1, Shl2 | Build shared library code, using default, type 1, or type 2, function entry sequences. |
| Swstna | Mark code as not requiring software stack checking (stack checking not applicable). |
| Swstackcheck | Build code with stack limit checking done in software. |

---

[8] Strictly, the join does not exist. We are using T loosely here.

| | |
|---|---|
| Chunkedstack | Build code without stack limit checking. |
| Usev7 | Note that code uses v7 (so it cannot link directly to code that checks the stack limit). |
| Ospace | Optimize for smallest size. |
| Otime | Optimize for fastest execution. |

*Precision of attribution*

Fundamentally, PCS attributes apply to individual functions. In practice, it is normal for all functions in an object to be built the same way, and to have the same build attributes.

The encoding of build attributes we use in ADS allows build attributes to be attached to an ELF section, or to an object. ADS-1.0 ELF producers (compilers and assemblers) record only one set of attributes per object. When the linker creates a partially linked object, it creates per-output-section attributes from the per-input-object attributes, in order to preserve needed distinctions until the final (image producing) linking step.

*PCS options and the assemblers*

When these options are given to the assemblers the build attributes are set accordingly, but it is the programmer's responsibility to ensure that the code conforms to the claims being made. In ADS-1.0, the assemblers do not try to check conformance (some checks could be made, but others require semantic knowledge).

3.5.3.1 Inter-working

The procedure call standard allows a function to call functions:

Built for the same instruction-set state.

Able to return to the caller's instruction-set state (built for inter-working).

Calls to functions built for the other instruction-set state are otherwise prohibited.

To diagnose faulty direct calls, a linker must know the inter-working status of each function (approximated by the inter-working status of the input section or object containing the function).

To warn pessimistically of the possibility of faulty indirect calls, a linker needs to know if:

Any data location is relocated with respect the address of a function that cannot inter-work.

The image contains both ARM and Thumb code.

It is, of course, impossible to tell whether or not a faulty call will be made.

3.5.3.2 Read-only position independence

We have chosen to implement read-only position independence (ROPI) in a manner that is interface compatible with position dependent code and data. This is the natural choice for C and assembly language, but causes some difficulties in C++ with v-tables. Thus ROPI is a minor variant attribute.

Note that this is an implementation choice, not an inevitable property of ROPI.

ROPI has a small cost so in general using it is not unconditionally better than not using it. Nonetheless, once ROPI has been used, a linker should select ROPI minor variant library members, if they are available. These observations tell us that the ROPI lattice chain should be:

$\perp$, ROPI

They also tell us that the ROPI attribute must reflect actual use, not potential use.

This scheme accurately models the *value* of ROPI, but by no means all aspects of ROPI. For example, one would expect that composing a not-ROPI object with an ROPI object *must* create a position-dependent entity. This is indeed, the case. The attribute that correctly models ROPI-ness under composition of objects (join of attributes) is *not*-ROPI (or position-dependent). However, in practice it is not to be very useful to model this. Unfortunately, the composition of two ostensibly ROPI sections can become position-dependent via relocated locations, in a manner that depends not on the relocations themselves, but on the definitions of the symbols with respect to which the relocations are made. As a consequence, a linker can diagnose very little of value without inspecting each relocation during the final relocation process.

For this reason, we do not model position dependence (not-ROPI-ness) as a section attribute.

3.5.3.3 Read-write position independence

Read-write position independent (RWPI) code addresses its data using position-independent offsets from SB (v6). It places two requirements on its execution environment:

> V6 must be used for no purpose other than as SB (a leaf function that does not use static data may save, use, and finally restore v6, provided SB is not required by any interrupt handler that might run concurrently).

> The execution environment must support giving a value to SB (either from the program loader, or through the run-time library).

These requirements are modeled by two attributes—USESV6 and RWPI. A function has the USESV6 attribute if it uses, or might us, v6 in any way that conflicts with the use of v6 as SB. It has the RWPI attribute if it requires the execution environment to have set up SB correctly.

As usual, the attributes of the containing object approximate those of the functions it contains.

A linker may diagnose a direct call from a function that uses v6 to one that is RWPI (but not vice versa, because v6 is preserved across function calls). A linker can also choose to warn if the address of any RWPI function is taken (in a way visible to the linker) in a program containing functions that use v6. Such a program might make a fatal indirect call from a v6-using function to an RWI function (but it is impossible to tell with certainty).

3.5.3.4 Shlclient, nousev6, usev6

The shlclient (nousev6) option instructs a compiler to avoid using v6 for any role other than SB. It removes the USEV6 attribute from the built object. Nousev6 code can be linked with RWPI code and shared library code provided a suitable SB-loading, tail-continuation veneer is inserted between nousev6 callers and RWPI callees.

By default, ARM code uses v6, but Thumb code does not.

3.5.3.5 Shl, shl1, and shl2

The SHL attribute is given to code that conforms to the ARM Shared Library Addressing Architecture [ASLAA]. Every static-data-using function that conforms to this architecture contains function-prologue code to load the correct value of SB on entry to the function.

Code that does not have the SHL attribute cannot be linked into a shared object (also called a shared library or dynamically linked library).

The SHL1 and SHL2 attributes denote different code generation options. The SHL1 option generates out-of-line code to compute the appropriate value of SB, which is slower than the SLH2 option, but centralizes the identity of the shared object in a single function. The SHL2 option generates in-line code to compute the appropriate value of SB, which is faster, but generates more code than the SHL1 option, and distributes the identity of the shared object through many locations that must be relocated when the library is first loaded.

3.5.3.6 Swstackcheck, swstna, nousev7, and usev7

Stack-limit-checked code checks SP against SL (v7) at every stack adjustment that might violate the PCS stack-usage rules. In particular, the stack front must be checked against the stack limit in the prologue of every non-leaf function, and every leaf function that uses more than 256 bytes of stack.

Stack-limit-checked code places two requirements on its execution environment:

> V7 must be used for no purpose other than as SL (a leaf function that uses no more than 256 bytes of stack may save, use, and restore SL, provided it is not needed by any interrupt handler that might run concurrently).

> The execution environment must support giving a value to SL (either from the program loader, or through the run-time library).

These requirements are modeled by three attributes—USESV7, STKCKD and ~STKCKD.

> A function has the USESV7 attribute if it uses, or might us, v7 in any way that conflicts with its use as SL. A usesV7 function cannot have the STKCKD attribute.

> A function has the STKCKD attribute if it requires the execution environment to have set up SL correctly.

> A function has the ~STKCKD attribute if it does not check the stack front against the stack limit when the stack-checked variant of the PCS would require it to do so.

As usual, the attributes of the containing object approximate those of the functions it contains.

STKCKD code cannot be mixed with ~STKCKD code in the same image. They are interface incompatible, and a linker should diagnose the incompatibility.

A linker may diagnose a direct call from a function that uses v7 to one that is STKCKD (but not vice versa, because v7 is a callee-saved register). A linker can also choose to warn if the address of any STKCKD function is taken (in a way visible to the linker) in a program containing functions that use v7. Such a program might make a fatal indirect call from a v7-using function to an STKCKD function (but it is impossible to tell with certainty).

By default, ARM code uses v7, but Thumb code does not.

Code built /swstna (software stack checking not applicable) has neither the STKCKD nor the ~STKCKD attribute. It is compatible with both STKCKD and ~STKCKD code. Every publicly visible function of such code must be observationally equivalent to a leaf function that uses no more than 256 bytes of stack.

3.5.3.7 Chunkedstack

The chunked stack option has not been implemented in ADS-1.0.

Code built for a chunked stack (sometimes called a spaghetti stack) must be built stack-limit checked. At the cost of a small overhead on limit-checked code for contiguous stacks, it is possible to use the same function prologue code for both contiguous and chunked stacks[9]—only the run-time support code changes. Thus STKCHNKD is a minor-variant-selecting attribute that causes the chunked-stack variant of the limit-checking code to be loaded from the run-time library.

Note that it is a design decision to implement chunked stack support in this way, not an inevitable property of chunked stacks.

3.5.3.8 Ospace and Otime

Using ADS, code can be built optimized for small size (-Ospace) or optimized for speed (-Otime). Code optimized differently can be mixed in the same image. In principle, these attributes can control minor variant selection (for example, selecting an unrolled variant of divide or memcpy rather than a slower, smaller, rolled variant). However, there are no minor variants in ADS-1.0

*Modeling user intent*

Ospace and Otime raise some questions about modeling user intent with attributes. What is intended when both attributes are mixed in an image, or when an image has neither attribute? This question is best answered by enumerating the possible optimization lattices:

$\bot$ < OSPACE < OTIME, alternatively OSPACE < OTIME.

$\bot$ < OTIME < OSPACE, alternatively OTIME < OSPACE.

$\bot$ < OSPACE < T, $\bot$ < OTIME < T (with two possible interpretations of T).

The first two pairs are structurally identical. The only degrees of freedom are:

The ordering of OSPACE and OTIME.

Whether there is a bottom that is neither OSPACE nor OTIME.

The choice of order is arbitrary, except that the preferred default should be lower down the lattice (even this is only convention—to avoid confusing ourselves—not necessity).

The choice of bottom element has wider implications—it determines a library's *base* attribute. If there is a separate $\bot$ element, the most compatible library must be built with no attributes but this gives the freedom to treat both Ospace and Otime as exceptional.

The third, more complex lattice accurately models the *incompatibility of intention* between OSPACE and OTIME. If an image has both attributes, the user is either confused, or does not care. Thus T should either be diagnosed as user confusion, or treated as $\bot$. Because the code itself is compatible, diagnosing incompatibility of intention seems a harsh and inconsistent way to treat a user who does not care.

In ADS-1.0, the defaults are set as follows:

Compilers—OSPACE, unless overridden by -Otime.

ARM assembler—OTIME.

---

[9] This is not done in ADS-1.0, so ADS-1.0 STKCKD code will not be compatible with future chunked-stack Thumb assembler—OSPACE.

*Library construction*

It is often the case that there is little size difference between a function optimized for size and the same function optimized for speed, but a significant performance difference. Dually, there might be little performance difference, but a significant size difference. In the first case we might want to choose the OTIME variant, even for OSPACE clients, and in the second case we might want to choose the OSPACE variant, even for OTIME clients.

Unfortunately, this cannot all work simultaneously using the minor variant selection algorithm defined in section 3.4.4, *Finding the best minor variant member in a library*.

*Correcting the ADS-1.0 mistake*

To handle optimization attributes more gracefully while maintaining compatibility with ADS-1.0 objects in the field, we need an object-producer option to suppress optimization attributes. This will allow us to construct libraries containing base members optimized for speed.

The ADS-1.0 optimization attribute lattice is OSPACE < OTIME. To avoid polluting a Thumb-mostly image whenever an ARM-assembly-language-derived object is included, the assembler default should be changed to OSPACE, and the assembler should comprehend –Ospace and –Otime as do the compilers.

3.5.3.9 Full IEEE754 floating-point arithmetic

There are two variants of the software floating-point arithmetic library:

One that implements the rounding mode and exceptions required by C and Java.

One that gives full control over the IEEE rounding modes and exceptions.

The default variant is both smaller and faster than the full IEEE 754 variant.

To select the full IEEE variant, the attribute PCS_FULL_IEEE must be added to the image. In ADS-1.0 there is no standard way to do this via the object producers but you can do it by faking a build attributes symbol containing $IEEEX in assembly language.

3.5.4 Memory-access capabilities

Historically, ARM processors have expected data to be naturally aligned—4-byte data on 4-byte boundaries, for example. ARM processors fetch a byte value by fetching the containing word and rotating the addressed byte into the least significant position (little endian) or most significant position (big endian). A memory capable of selecting just the right byte must broadcast the value on all byte lanes. ARM processors mimic this behavior when fetching a word from an unaligned address—the word is rotated so that the addressed byte is in the least significant position (little endian) or most significant position (big endian). The half word instructions (architecture 4 and later) behave analogously.

Historically, users of ARM processors have built memory systems with a variety of restricted capabilities:

On reading, the memory returns the word containing the addressed byte and the CPU does the rest.

The memory faults unaligned accesses.

The memory does not support half-word accesses.

In the future, ARM might want to support memories that behave more conventionally:

The memory reads or writes the addressed location, using the requested width of access, independent of alignment. The CPU does not rearrange the accessed data in any way.

3.5.4.1 Describing memory access capabilities

We use memory access attributes to describe the capabilities of regions of memory from the perspective of a running program. Attributes describe the ability of a memory to support a load from, or store to, a location of specified width and alignment.

| Lwa | Memory can return the contents of the naturally aligned location of width w (the location of width w whose address is 0 modulo w) that contains the addressed byte. The address must be 0 modulo a. |
|---|---|
| Swa | Memory can store the value of width w in the naturally aligned location of width w that contains the addressed byte. The address must be 0 modulo a. |
| ULwa | Memory can return the contents of the addressed location of width w. The address must be 0 modulo a. |
| USwa | Memory can store a value of width w in the addressed location. The address must be 0 modulo a. |

It should be clear that Lxx is the same as ULxx and Sxx is the same as USxx.

3.5.4.2 Minimum feasible requirements

An ARM must be able to load and store words, and bytes. The minimum capabilities of a memory attached to an ARM processor are, therefore:

L44 + L11 (+ S44 + S11 if the memory can be written).

In addition, in Thumb-state, a processor will fetch half words from instruction memory, to the absolute minimum additional capability is:

+ L22 (if the memory contains instructions).

In practice, Thumb-state is usually associated with the use of half words (to save data space, for example), so a sensible minimum requirement for Thumb is:

+ L22 (+ S22 if the memory is can be written).

Because ARM architecture 4 and later architectures support half word access, it is sensible in practice for ARM to adopt the Thumb default.

3.5.4.3 The user default

The default memory access attributes assumed by ARM object producers are:

L44 + L22 + L11 (+ S44 + S22 + S11 if the memory is can be written).

In ARM-state, you can disallow S22, disallow L22, and allow L41. The last option is only useful with architecture version 3 and an old-style memory system—it allows a compiler to simulate LDRH using an unaligned LDR and a shift operation.

3.5.4.4 The run-time library default

The ARM run-time library (run-time library kernel, C library, floating-point arithmetic library, and math library) is built without use of S22, and in ARM-state without use of L22. Code in it requires memory that meets only the minimum memory access requirements.

3.5.4.5 Memory access capabilities and regions of memory

Memory access capabilities can also be attached to regions of memory—perhaps corresponding to physical memories. This allows a tool chain to make some consistency checks between the demands placed on the execution environment by code and the capabilities of various memory regions.

The details of this remain to be worked out, and it is not supported in ADS-1.0.

3.6 Implementation details

3.6.1 Encoding attributes in ELF objects

Attributes are encoded in ELF objects in one or more BuildAttributes$$... symbols:

Attribute symbols are local symbols (ELF_ST_BIND(st_info) = STB_LOCAL)
Attribute symbols have no type (ELF_ST_TYPE(st_info) = STT_NOTYPE).
Attribute symbols have value 0.
The section in which an attribute symbol is defined is the section to which the attributes apply, or SHN_ABS if the attributes apply to all (relevant) sections in the object.

Attribute values are encoded case insensitively in the remainder of the symbol name, after the BuildAttributes$ prefix. Each code begins with a '$'. The following tables lists the codes used.

3.6.1.1 Architectural attributes (integer)

| | |
|---|---|
| $THUMB_ISAv2 | Uses Thumb instruction set version 2 (requires ARM_ISAv5). |
| $THUMB_ISAv1 | Uses Thumb instruction set version 1 (requires ARM_ISAv4). |
| $ARM_ISAv5 | Uses ARM instruction set version 5. |
| $ARM_ISAv4 | Uses ARM instruction set version 4. |
| $M | Uses the fast multiplier. |
| $E | Uses the DSP multiplier or other 'E' extensions. |
| $P | Uses the 'P' extensions, such as word-pair pre-fetch (load double). |

3.6.1.2 Architectural attributes (floating point)

| | |
|---|---|
| $FPAv3 | Requires FPA hardware to at least revision level 3. |
| $VFPv1 | Requires VFP hardware to at least revision level 1. |
| $AMPv1 | Requires AMP hardware (this is now obsolete). |

| | |
|---|---|
| $PE | Doubles are "pure endian"—required by VFP. |
| $ME | Little endian doubles nonetheless have their most significant word at the lowest address—required by FPA. |

3.6.1.3 Procedure call standard attributes—set using –apcs /option/option/...

| Attribute | Set by | Cleared by | Comment |
|---|---|---|---|
| $IW | /interwork | /nointer | Each function can return to its caller's instruction-set. |
| $~IW | /nointer | /interwork | At least one function in the object cannot inter-work. |
| $ROPI | /ropi | /noropi | Read-only sections are potentially position independent. |
| $RWPI | /rwpi | /norwpi | Code addresses static data using offsets from SB. |
| $USESV6 | /usev6, ARM default | /shlclient, /rwpi | Code uses V6 for a purpose other than SB. |
| $STKCKD | / swstackcheck | /swstna | Code is stack-limit checked. |
| $~ STKCKD | /noswst | /swst, /swstna | Code is not stack-limit checked. |
| $USESV7 | /usev7, ARM default | /swstna, /swst | Code uses V7 for a purpose other than SL. |
| $~SHL | - | /sharedlibrary | Code does not conform to the shared library architecture. |
| $STKCHNKD | / chunkedstack | - | Code requires chunked stack support. |
| $OTIME | -Otime | -Ospace | Code has been optimized for speed. |
| $OSPACE | -Ospace | -Otime | Code has been optimized for size. |
| $IEEEX | - | - | Code requires full IEEE floating point support. |

3.6.1.4 Memory access attributes

Memory access attributes can be encoded for different classes of memory. The syntax of the encoding (with literal text shown emboldened) is:

$ [ [ A | C | R | W | X ] : ] access-type+

Access type is one of the types explained in section 3.5.4, *Memory-access capabilities*. These are listed below. Aligned types denote capabilities or requirements to load or store the naturally aligned value of specified width containing the addressed byte. Unaligned types describe capability or requirement to load or store a value of specified width from a specified address boundary.

3.6.1.5 Memory access regions and designators

From the command line, memory access attributes are set and cleared using (literal text shown emboldened):

—memaccess [ region [ + region ]* : ] [ [ + | - ] access-type]+

| Designator | Meaning | Region name |
|---|---|---|
| A | All memory types | Omitted, or all |
| C | Read-only (code + data). | ro |
| R | Read-only data. | rodata |
| W | Read-write. | rw, or data |
| X | Read-only code. | text, or code |
| Default | Read-write. | rw, or data |

3.6.1.6 Memory access types

| Aligned types | Unaligned types | |
|---|---|---|
| L88, S88 | UL88, US88 | Note: L88 = UL88, S88 = US88. |
| L84, S84 | UL84, US84 | |
| L82, S82 | UL82, US82 | |
| L81, S81 | UL81, US81 | |
| L44, S44 | UL44, US44 | Note: L44 = UL44, S44 = US44. |
| L42, S42 | UL42, US42 | |
| L41, S41 | UL41, US41 | |
| L22, S22 | UL22, US22 | Note: L22 = UL22, S22 = US22. |
| L21, S21 | UL21, US21 | |
| L11, S11 | UL11, US11 | Note: L11 = UL11, S11 = US11. |

3.6.2 Encoding base attributes in library names

The names of the major library variants are:

*Root* [a|t] [f|v|a|_] [m|p|_] [s|u|_] [r|n|_]

Current library root names are:

c_ The run-time library kernel and ANSI C library.

f_ The software floating-point arithmetic library with default C/Java rounding modes and exceptions.

g_ The software floating-point arithmetic library with full control over IEEE exceptions and rounding modes.

m_ The mathematics (transcendental functions) library.

cpp_ The ISO C++ run-time library.

Different major variants of a library are distinguished as follows:

[a|t] Distinguish ARM and Thumb.

[f|v|a|_] Distinguish FPA, VFP, AMP, and no floating-point instruction-set.

[m|p|_] Distinguish mixed-endian, pure-endian, and no use of floating-point.

[s|u|_] Distinguish stack checked, stack unchecked, and stack checking not applicable (because, for example, every function appears to its callers as a leaf function using fewer than 256 bytes of stack).

[r|n|_] Distinguish re-entrant (static data addressed using offsets from SB), not re-entrant (static data addressed using address constants), and no mutable static data (compatible with both re-entrant and not re-entrant).

In ADS-1.0 there is no automatic mechanism to select the g variant of the software floating-point arithmetic library (it must be selected explicitly). This is because there is, as yet, no way to set the $IEEEX attribute in an object.

As discussed in section 3.4.3.4, *Modeling library relationships with attributes*, library root names and the concept of *related libraries* could all be swept up by the attributes mechanism. However, we have decided that this uniformity is not worth its loss of intuitive appeal.

It will be appreciated that the library selecting vector discussed above could have a wide variety of different forms and may be properly considered to be a library selector. The library selector could utilise various coding mechanisms, such as, for example, a list mechanism as will be familiar to those skilled in this technical field.

There are circumstances where the maximum level of execution environment requirement which is sought to be determined and managed by the present technique can more properly be considered to be a limiting level of execution environment requirement. In particular, there are circumstances in which a minimum level of execution environment requirement is what it is appropriate to identify and manage. As an example, a block of code which tests its operating environment to determine a version level of an instruction set architecture supported in that environment and then runs a version of itself appropriate to the operating environment can be considered to have a static type of execution environment requirement and a dynamic type of execution environment requirement. Whilst the block of code may preferably execute using its maximum instruction set architecture version encoding, it is capable of executing in lower instruction set architecture version environments and so the characteristic to determine regarding its dynamic characteristics is the minimum execution environment requirements concerned and this is done with a lattice theory meet operation as opposed to a lattice theory join operation which is utilised to identify a maximum.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A programmed computer apparatus for generating a group of machine code entities for execution upon a target data processing apparatus from a group of source code entities, each source code entity having at least one build option parameter, said apparatus for generating comprising:
   (i) library selector forming logic responsive to said at least one build option parameter of each source code entity for forming a library selector, wherein:
      (a) build option parameters of each source code entity are combined in accordance with lattice theory whereby each build option parameter has a value indicative of position within a partially ordered lattice chain representing relative execution environment requirements for that build option parameter, and
      (b) said library selector is formed with components corresponding to a limiting level of execution environment requirements among said group of source code entities;
   (ii) library selecting logic responsive to said library selector for selecting, from among a plurality of libraries of machine code entities, a selected library of machine code entities having a best level of execution environment requirements compatible with said limiting level of execution environment requirements indicated by said library selector; and
   (iii) machine code entity generating logic for generating said group of machine code entities from machine code entities within said selected library of machine code entities in dependence upon said group of source code entities.

2. Apparatus as claimed in claim 1, wherein said library selector forming logic uses said partially ordered lattice chains to detect if any incompatibilities are present between said source code entities.

3. Apparatus as claimed in claim 2, wherein a lattice top in an independent component of said library selector indicates an incompatibility.

4. Apparatus as claimed in claim 1, wherein said selected library of machine code entities contains at least two minor variants corresponding to at least one source code entity and said machine code entity generating logic selects between said at least two minor variants in dependence upon build option parameters associated with said at least one source code entity.

5. Apparatus as claimed in claim 1, wherein said source code entities are objects formed from one or more of:
   C source code;
   C++ source code; and
   target data processor assembly language source code.

6. Apparatus as claimed in claim 1, wherein at least one said build option parameter include an instruction set identifier for a target data processing apparatus.

7. Apparatus as claimed in claim 1, wherein said at least one build option parameter include an identification of optional instruction processing hardware within a target data processing apparatus required by a source code entity.

8. Apparatus as claimed in claim 1, wherein said at least one build option parameter include one or more of:
   whether a source code entity treats data words as big-endian or little-endian;
   position independence of a source code entity;
   whether a source code entity is stack checking or non-stack checking;
   what memory system capabilities are required by a source code entity; and
   what procedure call options are required for a source code entity.

9. Apparatus as claimed in claim 1, wherein those of said at least one build option parameters giving rise to greater demands upon an execution environment have associated advantages.

10. Apparatus as claimed in claim 1, wherein said library selector uses a list mechanism.

11. Apparatus as claimed in claim 1, wherein said limiting level of execution environment requirements is a minimum or maximum level of execution environment requirements.

12. Apparatus as claimed in claim 1, wherein said selected library has a greatest level of execution environment requirements that do not exceed those of the library selector.

13. A method of generating a group of machine code entities for execution upon a target data processing apparatus from a group of source code entities, each source code entity having at least one build option parameter, said method of generating comprising the steps of:
   (i) in response to said at least one build option parameter of each source code entity, forming a library selector, wherein:
      (a) build option parameters of each source code entity are combined in accordance with lattice theory whereby each build option parameter has a value indicative of position within a partially ordered lattice chain representing relative execution environment requirements for that build option parameter, and
      (b) said library selector is formed with components corresponding to a limiting level of execution environment requirements among said group of source code entities;

(ii) in response to said library selector, selecting, from among a plurality of libraries of machine code entities, a selected library of machine code entities having a best level of execution environment requirements compatible with said limiting level of execution environment requirements indicated by said library selector; and (iii) generating said group of machine code entities from machine code entities within said selected library of machine code entities in dependence upon said group of source code entities.

14. A method as claimed in claim 13, wherein said library selector uses a list mechanism.

15. A method as claimed in claim 13, wherein said limiting level of execution environment requirements is a minimum or maximum level of execution environment requirements.

16. A method as claimed in claim 13, wherein said selected library has a greatest level of execution environment requirements that do not exceed those of the library selector.

17. A computer readable medium storing a computer program for controlling a data processing apparatus to perform a method of generating a group of machine code entities for execution upon a target data processing apparatus from a group of source code entities, each source code entity having at least one build option parameter, said method of generating comprising the steps of:

(i) in response to said at least one build option parameter of each source code entity, forming a library selector, wherein:

(a) build option parameters of each source code entity are combined in accordance with lattice theory whereby each build option parameter has a value indicative of position within a partially ordered lattice chain representing relative execution environment requirements for that build option parameter, and (b) said library selector is formed with components corresponding to a limiting level of execution environment requirements among said group of source code entities;

(ii) in response to said library selector, selecting, from among a plurality of libraries of machine code entities, a selected library of machine code entities having a best level of execution environment requirements compatible with said limiting level of execution environment requirements indicated by said library selector; and (iii) generating said group of machine code entities from machine code entities within said selected library of machine code entities in dependence upon said group of source code entities.

18. A computer readable medium as claimed in claim 17, wherein said library selector uses a list mechanism.

19. A computer readable medium as claimed in claim 17, wherein said limiting level of execution environment requirements is a minimum or maximum level of execution environment requirements.

20. A computer readable medium as claimed in claim 17, wherein said selected library has a greatest level of execution environment requirements that do not exceed those of the library selector.

21. A method of forming a set of libraries of machine code entities for use in generating a group of machine code entities for execution upon a target data processing apparatus from a group of source code entities, each source code entity having at least one build option parameter, said method of forming comprising the steps of:

(i) associating a library selector with each library of machine code entities, wherein:

(a) supported build option parameters for each machine code entity within a library are combined in accordance with lattice theory whereby each build option parameter has a value indicative of position within a partially ordered lattice chain representing relative execution environment requirements for that build option parameter, and (b) said library selector is formed with components corresponding to a limiting level of execution environment requirements needed by said library of machine code entities; and (ii) determining from said library selector that at least one compatible library of machine code entities is present for each possible combination of build option parameters of said source code entities.

22. A method as claimed in claim 21, wherein said library selector uses a list mechanism.

23. A method as claimed in claim 21, wherein said limiting level of execution environment requirements is a minimum or maximum level of execution environment requirements.

24. A method as claimed in claim 21, wherein a selected library has a greatest level of execution environment requirements that do not exceed those of the library selector.

* * * * *